Patented Aug. 15, 1944

2,356,074

UNITED STATES PATENT OFFICE 2,356,074

ZINC SALT OF THE REACTION PRODUCTS OF ALIPHATIC ALCOHOLS AND TERPENE-PHOSPHORUS SULPHIDE

Robert L. May, Chicago, Ill., assignor to Sinclair Refining Company, New York, N. Y., a corporation of Maine No Drawing. Application July 14, 1943, Serial No. 494,691

5 Claims. (Cl. 260—429)

This invention relates to a novel composition of matter and more particularly to a new class of organic-metal compounds comprising the zinc salts of organic compounds resulting from the reaction of an aliphatic alcohol with a condensation product of a terpene, such as present in turpentine, and a phosphorus sulphide.

In my co-pending application Serial No. 494,-688, filed July 14, 1943, I have described and claimed a novel class of resin-like materials resulting from the condensation of turpentine with a phosphorus sulphide, including phosphorus pentasulphide, $P_2S_5$. My co-pending application Serial No. 494,689, also filed July 14, 1943, is directed to a novel class of compounds resulting from the reaction of an aliphatic alcohol with such condensation product of turpentine and $P_2S_5$.

I have now discovered that the products of the second-mentioned application react with zinc oxide, ZnO, to form a novel class of zinc salts of marked commercial value, particularly as components of lubricating oil compositions. Lubricating oil compositions comprising the zinc salts of my present invention are the subject of my co-pending application Serial No. 494,692, filed July 14, 1943.

In describing my present invention herein, I shall, for convenience and brevity, refer to the composition resulting from the reaction of turpentine with phosphorus pentasulphide as the turpentine-$P_2S_5$ condensation product and to the composition resulting from the reaction of said condensation product with alcohol as the intermediate material, each of which is hereinafter more fully described.

Though the intermediate material itself has been found to be a desirable component in lubricating oil compositions, the use of such intermediate materials for this purpose is subject to certain disadvantages. For instance, it is subject to the objection that they have somewhat acidic characteristics due to phosphorous acidity, which has been found to have a tendency to promote sludging of mineral oil compositions. The products of my present invention are free from this objection.

In general, my new class of compounds may be prepared by reacting the zinc oxide with the intermediate material by intimately admixing the zinc oxide with the intermediate material with moderate heating. The product of this reaction is then with advantage diluted and filtered to remove any excess or unreacted zinc oxide present. Where it is desired subsequently to remove the diluent from the product, it is advantageous to use a volatile solvent as the diluent. However, where the product is to be used as a component of lubricating oil compositions, the diluent used is with advantage a light, neutral lubricating oil fraction which may be permitted to remain in the product.

The characteristics of the products of my present invention vary somewhat depending upon the characteristics of the turpentine-$P_2S_5$ condensation product, the nature and proportions of the alcohol reacted therewith to form the intermediate material, the conditions under which the reactions are effected and, to some extent, upon the proportions of zinc oxide and the intermediate material used in its production. Also, the character of the product is influenced by the conditions under which the zinc oxide is reacted with the intermediate material.

The reaction temperature employed in the last-mentioned reaction in the preparation of my new class of zinc salts, is with advantage maintained within the range of about 275 to 300° F., though reaction temperatures somewhat outside of this range are permissible. I have also found it desirable to use an amount of zinc oxide somewhat in excess of that equivalent to the acid number of the intermediate material and to filter off unreacted, excess zinc oxide as previously indicated.

The molar proportions of $P_2S_5$, turpentine and alcohol used in the preparation of the intermediate material, which I react with zinc oxide in the preparation of my new class of compounds, may be varied over a considerable range. My new compositions of matter, prepared from intermediate materials in which the molar ratios of $P_2S_5$, turpentine and alcohol, respectively, used are within the range from about 2:5:5 to about 2:5:3, have been found particularly desirable. However, this range may with advantage be varied from about 2:4:4 to about 2:7:1.

The nature of the product is considerably influenced by the nature of the alcohol used in the preparation of the intermediate material. Aliphatic alcohols generally may be used for this purpose. For example, those having from 1 to 18 carbon atoms per molecule may be used with advantage. However, a particularly advantageous use of my new class of zinc salts is in the compounding of lubricants and, where alcohols of less than 5 carbon atoms per molecule have been used, the product has been found to lack satisfactory oil solubility. Therefore, where oil solubility is a desideratum, alcohols having 5 or more carbon atoms should be used. Alcohols which have been used in the preparation of the products of my present invention, having desirable oil solubility characteristics, include straight-chain primary alcohols of 5 to 18 carbon atoms per molecule, branched chain primary alcohols of 5 and 6 carbon atoms and secondary alcohols of 5 to 6 carbon atoms, respectively. Products prepared from intermediate material, in the preparation of which capryl alcohol, i. e. octanol-2, normal hexyl alcohol and lauryl alcohol, respectively, have been used, have been found especially desirable as components of lubricating oil compositions.

I am unable at present definitely to identify by chemical formula either the compounds of my present invention or the intermediate material or the turpentine-$P_2S_5$ condensation product from which they are prepared. However, I have found it desirable that the turpentine-$P_2S_5$ condensation product used in the preparation of my zinc salts contains no unreacted $P_2S_5$ for, in the treatment of my turpentine-$P_2S_5$ condensation product with the alcohol, any unreacted $P_2S_5$ present has been found to react with the alcohol to form esters of thiophosphoric acid, the presence of which is usually undesirable.

Since the characteristics of my new products are influenced by the characteristics of the intermediate material from which they are prepared, the proportion of such intermediate materials and the characteristics thereof will be set forth in the hereinafter appearing specific illustrations of my present invention. However, it will be understood that my new class of zinc salts may be prepared directly from previously prepared intermediate products and that, though the zinc salts specifically illustrated have been found particularly desirable for special purposes, the invention is not limited to the specific products shown but is illustrated thereby.

Generally, in the preparation of the turpentine-$P_2S_5$ condensation product, used in the production of my new zinc salts, the molar ratio of turpentine to $P_2S_5$ is with advantage within the range of about 1:1 to about 3:1. When ratios higher than about 3:1 are used, the product has been found to contain unreacted turpentine. Molar ratios of about 3:2 have been found to give particularly desirable results.

The reaction of turpentine with $P_2S_5$ is highly exothermic and proceeds spontaneously after being initiated by slight heating. A desirable method of effecting this reaction is to heat the turpentine in a vessel to about 200° F., and then, without further heating, slowly stirring in the phosphorus pentasulphide in the powdered form. The heat of reaction is great and consequently the sulphide should be added slowly so as to avoid the possibility of the reaction's becoming uncontrollable. For the purposes of my present invention, it is desirable that the temperature during this addition not be permitted to exceed about 250° F., although higher temperatures are permissible.

After the addition of the phosphorus pentasulphide is completed and the exothermic heating is lessened, it is usually necessary to apply heat externally to complete the reaction. The temperature during this last stage is preferably maintained at about 300° F., though temperatures of about 200° to 400° F. may be employed. The second stage of the reaction should be continued until all of the $P_2S_5$ is dissolved. The material thus prepared is a viscous liquid at elevated temperatures but, in the absence of excess turpentine, solidifies on cooling to room temperature.

In general, the intermediate material used in the preparation of my new zinc salts may be prepared by adding the alcohol gradually to the turpentine-$P_2S_5$ condensation product, advantageously at a temperature of about 250° F. In reacting the alcohol with the turpentine-$P_2S_5$ condensation product, very little heat is evolved. After the alcohol has been added, the mixture is with advantage maintained at a temperature of 200 to 220° F., for about 2 hours with stirring. The nature and proportions of the alcohol added are subject to a considerable variation depending upon the particular characteristics of the product desired. The proportion of alcohol used is also dependent upon the ratio of turpentine to $P_2S_5$ used in the preparation of the condensation product from which the intermediate material is prepared.

The following specific examples of various members of my new class of compounds and the procedure by which they have been successfully prepared, are given as illustrative of the class:

*Example I*

In a 3-liter, 3-necked flask, equipped with a stirrer, a thermometer and a funnel, there was placed 1360 grams (10 moles) of steam-distilled wood turpentine. The turpentine was heated to about 200° F. by means of an electric heater placed under the flask. The heat was then turned off, the stirrer started and 888 grams (4 moles) of powdered phosphorus pentasulphide slowly added to the heated turpentine portionwise. About 30 to 40 gram portions of the sulphide were added at first and after about half the sulphide was added the portions were increased to about 100 grams each. The temperature was controlled by the rate of addition of the phosphorus pentasulphide so that it did not exceed 250° F. When all the phosphorus pentasulphide had been added and the exothermic reaction had stopped, as shown by a dropping of the temperature, the heater was again turned on and the mixture stirred and heated slowly to 300° F., and maintained at that temperature for about 4 hours. At the end of this period, all of the phosphorus pentasulphide was dissolved and the product was a viscous amber-colored liquid. The heat was then turned off and the mixture allowed to cool to about 250° F., and, while at this temperature, 1300 grams (10 moles) of capryl alcohol (octanol-2) were added slowly over a period of 30 minutes. The heater was again turned on and the temperature held at 200 to 220° F. for 2 hours.

The intermediate material thus prepared was found by analysis to have an acid number of 114.2 and a saponification number of 146.9 and to contain 7.09% phosphorus and 17.4% sulphur, by weight.

222 grams of the resultant intermediate material was placed in a 1-liter beaker and 20 grams of zinc oxide was added. The mixture was then heated to 180° F. and stirred continuously for 1 hour. Thereafter, the temperature was raised slowly to 320° F. and held at that temperature for 15 minutes, the stirring being continued. 713 grams of 100-pale oil prepared from Gulf Coast crude, hereinafter more fully described, was then added and the mixture heated to 250° F., and, while at this temperature, 2% by weight of a filter-aid was added and the material filtered to remove any unreacted zinc oxide.

The product was found by analysis to have an acid number of 11.0 and to contain 1.72% phosphorus, 4.25% sulphur and 1.22% zinc, each by weight.

Example II

An intermediate material was prepared as in Example I, except that 780 grams (6 moles) of the capryl alcohol was added instead of the amount specified in Example I. The resultant intermediate material was found by analysis to have an acid number of 71, a saponification number of 162.9 and to contain 8.07% phosphorus and 20.3% sulphur, each by weight.

210 grams of this intermediate material was placed in a 1-liter beaker with 30 grams of zinc oxide, the mixture was stirred and heated to 180° F. for 1 hour and then slowly heated to 320° F. and held at that temperature for 15 minutes. Thereafter, 615 grams of the 100-pale oil used in Example I was added and the mixture heated and filtered as described in the previous example.

The product was found by analysis to have an acid number of 7.6 and to contain 2.06% phosphorus, 5.05% sulphur and 1.42% zinc, each by weight.

Example III

In a 5-liter flask, equipped as described in Example I, there was placed 2040 grams (15 moles) of steam-distilled wood turpentine, the turpentine was heated to about 200° F., the heat turned off and 1332 grams (6 moles) of powdered phosphorus pentasulphide was added portionwise and stirred into the turpentine. The first half of the sulphide was added in about 50 gram portions and the second half in about 100–150 gram portions. The rate of addition was controlled so that the temperature of the reaction did not exceed 300° F. When the last of the sulphide was added and the heat of the reaction began to subside, external heat was applied and the reaction mixture stirred and heated to about 300° F., and maintained at this temperature for about 4 hours while stirring. At the end of this period, the phosphorus pentasulphide was dissolved. The heater was then turned off, the contents of the flask permitted to cool to 250° F., and, while at this temperature, 1170 grams (9 moles) of capryl alcohol was slowly added. After all the alcohol had been added, the temperature of the mixture was maintained at 200 to 220° F. for about 2 hours.

The intermediate material resulting from the above-described procedure was found by analysis to have an acid number of 64.9, a saponification number of 156.8, and to contain 8.2% phosphorus and 20.8% sulphur, by weight.

8853 grams of the intermediate material, resulting from this operation and from a second identical operation, was placed in a 5 gallon pail equipped with a stirrer and heated by an electric hot plate. 675 grams of zinc oxide was added and the mixture slowly heated to 180 to 190° F., with vigorous stirring to keep the material from caking on the bottom of the pail. As a result of the reaction, water was eliminated and there was considerable foaming of the mixture. When the water of reaction was eliminated, as evidenced by the cessation of the foaming, the temperature was slowly increased to a maximum of 300° F., and held at that temperature for about 2 hours. The reaction product was then diluted with 8853 grams of a Mid-Continent neutral oil, hereinafter more fully described, heated to 250° F., and filtered as previously described.

The product was found by analysis to have an acid number of 18.7 and to contain 3.79% phosphorus, 8.48% sulphur and 2.06% zinc, by weight.

Example IV 680 grams (5 moles) of turpentine was placed in a 2-liter flask, such as previously described, and stirred while being heated to 225° F. 444 grams of powdered phosphorus pentasulphide was then added to the turpentine at such a rate that the temperature did not rise above 250° F. After all the sulphide had been added, the temperature of the mixture was raised to 300° F., and maintained at that temperature for about 3 hours, at the end of which period all the phosphorus and sulphide was dissolved. The mixture was then permitted to cool to 250° F., and 264 grams of "Pentasol," a commercial mixture of amyl alcohols, was added. The temperature was then maintained at 220° for an additional hour.

The intermediate material thus prepared was found by analysis to have an acid number of 74.6 and a saponification number of 181.1 and to contain 9.23 phosphorus and 21.57% sulphur by weight.

750 grams of this intermediate material and 120 grams of zinc oxide were heated with stirring in a 2-liter beaker for 1 hour at 180° F., and finally heated at 300° F., for 30 minutes. Thereafter, 2250 grams of the Mid-Continent neutral oil, used in Example III, was added, the mixture heated to a temperature of 250° and the product filtered at this temperature. On cooling, a slight precipitate formed. Upon the addition of further lubricating oil to portions of the product in amounts sufficient to produce concentrations of about 1% to about 5% of the product, a haze formed in the oil mixtures but was readily removed by filtration without detriment to the product.

The product was found by analysis to have an acid number of 15.5 and to contain 1.88% phosphorus, 5.10% sulphur and 1.07% zinc, by weight.

Example V 680 grams (5 moles) of steam-distilled turpentine was placed in a 3-liter flask, such as previously described, and heated to 225° F. There was then added 444 grams (2 moles) of powdered phosphorus pentasulphide in 25 to 30 gram portions at such a rate as to hold the temperature below 250° F. When all of the phosphorus pentasulphide was added, the mixture was heated to 300° F. and maintained at this temperature for 3 hours, at the end of which period the phosphorus pentasulphide was dissolved. The mixture was then cooled to 250° F., and 306 grams (3 moles) of 2-ethyl butanol-1 was added over a period of 30 minutes with continuous stirring and the temperature held at about 200 to 220° F. for 1 hour after the addition of the alcohol.

The intermediate material thus produced was found by analysis to have an acid number of 74.9 and a saponification number of 176.2 and to contain 8.96% phosphorus and 22.1% sulphur by weight.

1185 grams of this intermediate material and 120 grams of zinc oxide were heated and stirred in a 2-liter beaker, as in Example IV, and 3555 grams of the Mid-Continent neutral oil used in Example III was added, the mixture heated to 250° F., and filtered while hot. As in Example IV, the product was not entirely soluble in the lubricating oil fraction in this concentration but produced clear solutions upon further filtration.

The product was formed by analysis to have an acid number of 18.3 and to contain 1.98% phosphorus, 5.42% sulphur and 1.10% zinc by weight.

Example VI

A 3-liter, round-bottomed flask, fitted with a stirrer, was charged with 680 grams of turpentine. The turpentine was heated to 200° F., heating discontinued and 444 grams of powdered phosphorus pentasulphide was added, with stirring, in portions of about 25 to 30 grams each and at a rate such that the temperature did not rise above 250° F. After all the phosphorus pentasulphide had been added, the temperature was raised to 300° F., and maintained at that temperature for 3 hours, at the end of which period all of the sulphide was dissolved. Thereafter, the mixture was cooled to 250° F. and 306 grams of normal hexyl alcohol was added and the temperature of the mixture held at about 200° F. for about 1 hour.

The resultant intermediate material was found by analysis to have an acid number of 74.0 and a saponification number of 172.1 and to contain 8.20% phosphorus and 21.57% sulphur by weight.

685 grams of this intermediate material and 120 grams of zinc oxide were admixed and heated as in Example IV, the product diluted with 2055 grams of the Mid-Continent neutral oil and filtered. This product was not completely oil-soluble but upon further dilution and filtration a clear solution was obtained.

The product was found by analysis to have an acid number of 19.9 and to contain 2.13% phosphorus, 5.51% sulfur and 1.58% zinc, by weight.

Example VII 340 grams (2.5 moles) of turpentine was heated to 200° F., and 222 grams (1 mole) of powdered phosphorus pentasulfide was added slowly as previously described. After the sulfide was all dissolved, 279 grams (1.5 moles) of "Lorol," a commercial mixture of alcohols made from hydrogenated fatty acid esters from palm oil and containing from 10 to 14 carbon atoms per molecule, was added and the mixture maintained for 1 hour at a temperature of 220° F.

The resultant intermediate material was found by analysis to have an acid number of 67.2 and a saponification number of 147.3 and to contain 7.18% phosphorus and 19.80% sulphur, by weight.

654 grams of this intermediate material and 48 grams of zinc oxide were placed in a 1500 milliliter beaker and stirred while being heated slowly to 300° F. At about 190° F. to 220° F. some foaming and water evolution took place. The heating extended over a period of about 1 hour. Thereafter, the product was diluted by the addition of 654 grams of the Mid-Continent neutral oil, the mixture heated to 250° F. and filtered.

The product was found by analysis to have an acid number of 21.9 and to contain 3.48% phosphorus, 8.65% sulphur and 1.71% zinc by weight.

Example VIII

To a turpentine-$P_2S_5$ condensation product, prepared as in Example VII, there was added 405 grams (1.5 moles) of octadecyl alcohol and the mixture maintained at 220° F. for 1 hour. The resulting intermediate product was found by analysis to have an acid number of 57.2 and a saponification number of 131.6 and to contain 6.52% phosphorus and 17.20% sulphur by weight.

742 grams of this intermediate material and 47 grams of zinc oxide were placed in a 1500 milliliter beaker and stirred while being slowly heated to 300° F. Thereafter, the product was diluted by the addition of 742 grams of the Mid-Continent neutral lubricating oil and the mixture heated to 250° F., and filtered. This product was found by analysis to have an acid number of 19.8 and to contain 2.91% phosphorus, 6.90% sulphur and 1.90% zinc by weight.

The 100-pale oil diluent used in the foregoing Examples I and II and the Mid-Continent neutral oil used in the foregoing Examples III to VIII, inclusive, had the following characteristics:

|  | 100-pale oil | Mid-Continent neutral |
|---|---|---|
| Gravity, ° A. P. I. | 22.1 | 27.9 |
| Flash, °F. | 300 | 365 |
| Fire, °F. | 350 | 405 |
| Viscosity at 100 S. U. S. | 107.8 | 107.8 |
| Viscosity at 210 S. U. S. | 38.4 | 39.5 |

Further illustrations of my new class of compounds appear in the following tabulation. The respective members of the class were prepared according to the general procedure previously described. In each of these examples the alcohol used was capryl alcohol. For a more complete description of the products, specific reaction conditions and proportions of the several constituents, together with the characteristics of the intermediate materials used in their preparation, are included:

| Example No. | Intermediate material prepared from— | | | Analysis of intermediate material | | | | Preparation of final product | | | | Analysis of final product | | | |
|---|---|---|---|---|---|---|---|---|---|---|---|---|---|---|---|
|  | $P_2S_5$, mols. | Turpentine, mols. | Alcohol, mols. | Acid No. | Sap. No. | P, wt. per cent | S, wt. per cent | Intermediate material, gms. | Zinc oxide, gms. | Max. temp., °F. | Conc. of product in final oil concentrate | Acid No. | P, wt. per cent | S, wt. per cent | Zn, wt. per cent |
| IX | 2 | 4.9 | 3.1 | 71.1 | 136.8 | 8.04 | 20.4 | 150 | 50 | 250 | 25 | 7.75 | 1.90 | 4.90 | 1.80 |
| X | 2 | 4.9 | 3.1 | 71.1 | 136.8 | 8.04 | 20.4 | 150 | 50 | 190 | 100 | 19.7 | 7.84 | 19.9 | 5.70 |
| XI | 2 | 5 | 5 | 55.6 | 136.1 | 6.77 | 16.9 | 1,000 | 174 | 300 | 25 | 13.3 | 1.74 | 4.14 | 1.27 |
| XII | 2 | 5 | 5 | 55.6 | 136.1 | 6.77 | 16.9 | 500 | 51 | 300 | 25 | 12.4 | 1.71 | 4.22 | 0.79 |
| XIII | 4 | 10 | 10 | 114.2 | 146.9 | 7.09 | 17.4 | 222 | 20 | 250 | 25 | 11.4 | 1.73 | 4.30 | 1.04 |
| XIV | 4 | 10 | 10 | 114.2 | 146.9 | 7.09 | 17.4 | 222 | 30 | 250 | 25 | 7.0 | 1.69 | 4.12 | 1.13 |
| XV | 4 | 10 | 6 | 71.0 | 162.9 | 8.07 | 20.3 | 210 | 20 | 250 | 25 | 10.5 | 2.10 | 5.24 | 1.10 |
| XVI | 4 | 10 | 6 | 71.0 | 162.9 | 8.07 | 20.3 | 210 | 30 | 250 | 25 | 10.4 | 2.04 | 4.92 | 1... |
| XVII | 4 | 10 | 6 | 71.0 | 162.9 | 8.07 | 20.3 | 210 | 30 | 250 | 25 | 10 | 2.06 | 5.24 | 1.18 |
| XVIII | 4 | 10 | 6 | 71.0 | 162.9 | 8.07 | 20.3 | 210 | 40 | 300 | 25 | 12.6 | 2.04 | 5.16 | 1.17 |
| XIX | 4 | 10 | 6 | 71.0 | 162.9 | 8.07 | 20.3 | 945 | 150 | 300 | 25 | 10.6 | 1.94 | 4.72 | 0.76 |
| XX | 6 | 15 | 9 | 65 | 92.1 | 7.88 | 20.4 | 520 | 185 | 275 | 25 | 9.9 | 1.96 | 5.17 | 1.30 |
| XXI | 6 | 15 | 9 | 65 | 92.1 | 7.88 | 20.4 | 520 | 185 | 275 | 25 | 10.4 | 1.97 | 4.83 | 0.89 |
| XXII | 6 | 15 | 9 | 65 | 92.1 | 7.88 | 20.4 | 1,514 | 120 | 300 | 50 | 25.8 | 4.05 | 9.45 | 2.05 |
| XXIII | 6 | 15 | 9 | 65 | 92.1 | 7.88 | 20.4 | 1,514 | 100 | 300 | 50 | 29.9 | 4.04 | 9.84 | 1.70 |
| XXIV | 6 | 15 | 9 | 64.9 | 156.8 | 8.02 | 20.8 | 1,514 | 88 | 300 | 50 | 32.0 | 39.6 | 9.59 | 1.75 |
| XXV | 6 | 15 | 9 | 64.9 | 156.8 | 8.02 | 20.8 | 520 | 185 | 275 | 25 | 9.0 | 1.63 | 4.12 | 0.77 |
| XXVI | 6 | 15 | 9 | 64.9 | 156.8 | 8.02 | 20.8 | 1,514 | 100 | 300 | 50 | 20.2 | 3.95 | 10.37 | 2.02 |

From the specific illustrations herein, it appears that the combining ratios of zinc oxide and the intermediate material vary somewhat with the excess of zinc oxide present and also the temperature at which the reaction is effected. The duration of the reaction period also appears to influence the zinc content of the finished product. The presence of a considerable excess of zinc oxide during the reaction is usually desirable.

The turpentine-$P_2S_5$ condensation product from which the members of my new class of compounds are prepared is, in the absence of excess turpentine, normally a brittle, resinous solid. It is with advantage prepared from turpentine, either steam-distilled wood turpentine or gum spirits, consisting mainly of alpha pinene, a bicyclic terpene having the empirical formula $C_{10}H_{16}$. Pure alpha pinene and other more costly terpenes will react similarly with $P_2S_5$ but, for reasons including economic considerations, I prefer to use the more readily available turpentine. The turpentine used in the specific examples herein was a technical grade steam-distilled wood turpentine comprising about 90% alpha pinene.

I claim:
1. The reaction product of zinc oxide and an organic compound resulting from the reaction of an aliphatic alcohol with a condensation product of turpentine and phosphorus pentasulphide.
2. The reaction product of zinc oxide and an organic compound resulting from the reaction of an aliphatic alcohol having not fewer than 5 carbon atoms per molecule with a condensation product of turpentine and phosphorus pentasulphide.
3. The reaction product of zinc oxide and an organic compound resulting from the reaction of capryl alcohol with a condensation product of turpentine and phosphorus pentasulphide.
4. The reaction product of zinc oxide and an organic compound resulting from the reaction of normal hexyl alcohol with a condensation product of turpentine and phosphorus pentasulphide.
5. The reaction product of zinc oxide and an organic compound resulting from the reaction of lauryl alcohol with a condensation product of turpentine and phosphorus pentasulphide.

ROBERT L. MAY.

CERTIFICATE OF CORRECTION.

Patent No. 2,356,074.   August 15, 1944.

ROBERT L. MAY.

It is hereby certified that error appears in the printed specification of the above numbered patent requiring correction as follows: In the table at the bottom of page 4, last column thereof, opposite Example No. XVI, the indistinct number should appear as --1.31--; and that the said Letters Patent should be read with this correction therein that the same may conform to the record of the case in the Patent Office.

Signed and sealed this 14th day of November, A. D. 1944.

Leslie Frazer

Acting Commissioner of Patents.

(Seal)

From the specific illustrations herein, it appears that the combining ratios of zinc oxide and the intermediate material vary somewhat with the excess of zinc oxide present and also the temperature at which the reaction is effected. The duration of the reaction period also appears to influence the zinc content of the finished product. The presence of a considerable excess of zinc oxide during the reaction is usually desirable.

The turpentine-$P_2S_5$ condensation product from which the members of my new class of compounds are prepared is, in the absence of excess turpentine, normally a brittle, resinous solid. It is with advantage prepared from turpentine, either steam-distilled wood turpentine or gum spirits, consisting mainly of alpha pinene, a bicyclic terpene having the empirical formula $C_{10}H_{16}$. Pure alpha pinene and other more costly terpenes will react similarly with $P_2S_5$ but, for reasons including economic considerations, I prefer to use the more readily available turpentine. The turpentine used in the specific examples herein was a technical grade steam-distilled wood turpentine comprising about 90% alpha pinene.

I claim:
1. The reaction product of zinc oxide and an organic compound resulting from the reaction of an aliphatic alcohol with a condensation product of turpentine and phosphorus pentasulphide.
2. The reaction product of zinc oxide and an organic compound resulting from the reaction of an aliphatic alcohol having not fewer than 5 carbon atoms per molecule with a condensation product of turpentine and phosphorus pentasulphide.
3. The reaction product of zinc oxide and an organic compound resulting from the reaction of capryl alcohol with a condensation product of turpentine and phosphorus pentasulphide.
4. The reaction product of zinc oxide and an organic compound resulting from the reaction of normal hexyl alcohol with a condensation product of turpentine and phosphorus pentasulphide.
5. The reaction product of zinc oxide and an organic compound resulting from the reaction of lauryl alcohol with a condensation product of turpentine and phosphorus pentasulphide.

ROBERT L. MAY.

---

CERTIFICATE OF CORRECTION.

Patent No. 2,356,074.        August 15, 1944.

ROBERT L. MAY.

It is hereby certified that error appears in the printed specification of the above numbered patent requiring correction as follows: In the table at the bottom of page 4, last column thereof, opposite Example No. XVI, the indistinct number should appear as --1.31--; and that the said Letters Patent should be read with this correction therein that the same may conform to the record of the case in the Patent Office.

Signed and sealed this 14th day of November, A. D. 1944.

Leslie Frazer

Acting Commissioner of Patents.

(Seal)